United States Patent
Wilde et al.

(10) Patent No.: US 7,144,476 B2
(45) Date of Patent: Dec. 5, 2006

(54) CARBON FIBER ELECTRODE SUBSTRATE FOR ELECTROCHEMICAL CELLS

(75) Inventors: Peter Wilde, Meitingen (DE); Michael Maendle, Gersthofen (DE); Heiko Leinfelder, Noerdlingen (DE); Josef Steinhart, Neusaess (DE)

(73) Assignee: SGL Carbon AG, Wiesbaden (DE)

( * ) Notice: Subject to any disclaimer, the term of this patent is extended or adjusted under 35 U.S.C. 154(b) by 582 days.

(21) Appl. No.: 10/406,699

(22) Filed: Apr. 3, 2003

(65) Prior Publication Data

US 2003/0194557 A1    Oct. 16, 2003

Related U.S. Application Data

(60) Provisional application No. 60/372,538, filed on Apr. 12, 2002.

(51) Int. Cl.
*D21H 13/50* (2006.01)
*H01M 4/96* (2006.01)

(52) U.S. Cl. ............ 162/138; 162/157.1; 162/181.9; 162/197; 428/299.1; 428/408; 429/44

(58) Field of Classification Search ........... 162/129, 162/106, 118, 119, 138, 140, 146, 148, 149, 162/157.1, 164.1, 168.1, 181.9, 197, 270; 264/29.1, 29.2; 428/299.1, 293.4, 408; 429/44, 429/209

See application file for complete search history.

(56) References Cited

U.S. PATENT DOCUMENTS

| | | | |
|---|---|---|---|
| 4,313,972 A | 2/1982 | Goller et al. | |
| 4,851,304 A | 7/1989 | Miwa et al. | |
| 5,532,083 A * | 7/1996 | McCullough | ............ 429/210 |
| 5,998,057 A | 12/1999 | Koschany et al. | |
| 6,399,202 B1 * | 6/2002 | Yu et al. | ............ 428/403 |
| 6,713,034 B1 * | 3/2004 | Nakamura et al. | ........ 423/447.2 |
| 2002/0029842 A1 * | 3/2002 | Nishida et al. | ............ 156/171 |
| 2002/0058179 A1 * | 5/2002 | Segit et al. | ............ 429/44 |
| 2002/0175073 A1 | 11/2002 | Nakamura et al. | |
| 2003/0165740 A1 * | 9/2003 | Edwards et al. | ............ 429/232 |
| 2004/0058123 A1 * | 3/2004 | Cooper et al. | ............ 428/105 |

FOREIGN PATENT DOCUMENTS

| | | |
|---|---|---|
| EP | 0 791 974 A1 | 8/1997 |
| EP | 1 139 471 A1 | 10/2001 |
| EP | 1139471 A1 | 10/2001 |
| JP | 03150266 A | 6/1991 |
| JP | 05017260 A | 1/1993 |
| WO | WO 00/55933 * | 9/2000 |
| WO | WO 01/56103 * | 8/2001 |
| WO | WO 01/56103 A1 | 8/2001 |
| WO | WO 02/22952 A2 | 3/2002 |
| WO | WO 01/56103 A1 | 11/2002 |

\* cited by examiner

OTHER PUBLICATIONS

Spectracorp, "Development and Optimization of Porous Carbon Papers Suitable for Gas Diffusion Electrodes", Dec. 2000.*

*Primary Examiner*—Eric Hug
(74) *Attorney, Agent, or Firm*—ProPat, L.L.C.

(57) ABSTRACT

This invention relates to electrode substrates for electrochemical cells, particularly low-temperature fuel cells, and processes for their production. Low-cost carbon fiber paper structures are used as precursor for preparation of an all-carbon product that has a high electric conductivity and porosity and can be processed in a continuous reel-to-reel mode. These paper materials are further impregnated and processed to adjust the final product properties. This all-carbon electrode substrate is not brittle thereby avoiding the main disadvantage of the prior art.

20 Claims, 3 Drawing Sheets

CARBON FIBER ELECTRODE SUBSTRATE FOR ELECTROCHEMICAL CELLS

CLAIM FOR PRIORITY

This non-provisional application claims the benefit of the filing date of U.S. Provisional Patent Application Ser. No. 60/372,538, of the same title, filed Apr. 12, 2002.

FIELD OF THE INVENTION

The invention relates to electrode substrates for electrochemical cells, particularly Polymer Electrolyte Membrane Fuel Cells (PEMFC) and Phosphoric Acid Fuel Cells (PAFC), and processes for their production.

BACKGROUND OF THE INVENTION

A fuel cell converts a fuel such as hydrogen, and an oxidant, typically oxygen or air, via electrochemical reactions into electricity, reaction products and excess heat. As shown in FIG. 1, a single fuel cell 1 is typically constituted of an electrolyte layer e.g. a proton-conducting polymer membrane 2, sandwiched between two typically flat porous electrodes 3 and 4, individually referred to as the anode and the cathode. The electrodes 3 and 4 are comprised of reactant-permeable electron-conducting substrates 3' and 4' with the surfaces adjacent to the electrolyte covered with thin porous active layers 3" and 4" containing the electro-catalysts typically comprising metals from the platinum group.

Oxidation of hydrogen at the anode catalyst layer 3" generates protons and electrons. The protons are transferred across the electrolyte to the cathode. The electrons travel via an external circuit to the cathode. At the cathode catalyst layer 4", oxygen is reduced by consumption of two electrons per atom to form oxide anions which react with the protons that have crossed the electrolyte layer to form water.

A plurality of single cells is usually assembled in a stack to increase the voltage and power output. Within the stack, adjacent single cells are electrically connected by means of bipolar plates (BPP) 5 and 6 positioned between the surfaces of the electrodes opposite to those covered with the catalyst layer. The BPP must be impermeable for the reactants to prevent reactant permeation to the opposite electrode. With respect to this function, the BPP is often referred to as separator, too. Flow channels 5' and 6' on the surfaces of the BPP provide access for the fuel to the adjacent anode 3 and for the oxidant to the adjacent cathode 4 and removal of the reaction products and the unreacted remnants of fuel and oxidant.

The electrodes each comprise a thin catalyst layer 3" and 4" backed by an electron-conducting porous inert substrate 3' and 4'. The latter is often referred to as gas diffusion layer (GDL) or more generally as electrode substrate (ES). Such electrode substrates have to provide both an efficient entry passage for the fuel or the oxidant, respectively, to the catalyst layer as well as an exit for the reaction products away from the catalyst layer into the flow channel of the adjacent BPP. Within the porous electrode substrate the reactants have to be effectively transported and evenly distributed. To facilitate these mass transfer processes it is preferable that the pore fraction of the electrode substrate is large. On the other hand, the requirements of low Ohmic (electrical) resistance and adequate mechanical strength have to be fulfilled, too. Hence high porosity of an ES has to be balanced against improved through-plane conductivity.

To achieve high-volume production, it is desirable that the electrode substrate can be processed as a continuous roll material. This allows the application of cost-effective industrial scale processes for the catalyst layer deposition onto the substrate and other subsequent manufacturing steps. Moreover, a continuous roll ES provides higher homogeneity and product uniformity in comparison with ES produced in a batch-mode.

Besides the requirements discussed above the electrode material must be inert with respect to the fuels, oxidants and reaction products and stable against corrosion.

ES materials suitable for fuel cell application include carbon fibers (as non-woven or as woven cloth), metal fibers (mesh or gauze), and polymers (gauze filled with conductive particles, e.g. carbon particles). Non-wovens can be manufactured by wet laying or dry laying (e.g. paper-making) techniques.

A commonly used type of carbon fiber ES comprises carbon fibers randomly dispersed within a two-dimensional plane and mutually bond by means of a carbonized binder e.g. a carbonized resin (cf. U.S. Pat. No. 4,851,304). This electrode substrate is obtained by preparing a carbon fiber mat via paper-making technique, impregnation of the dried fiber mat with a carbonizable binder to obtain a prepreg, hot pressing of the prepreg and subsequent carbonization or graphitization of the carbonizable binder. Carbonizable binder means a binder that can be converted to elemental carbon in a high yield when heated above the decomposition temperature under an inert atmosphere. The electrode substrate made this way is an all carbon product. The carbonized binder particles contribute not only to the mechanical stability of the ES but also bring about a lowering of the resistivity in the through-plane direction which otherwise would be poor because of the mainly planar alignment of the carbon fibers within the mat.

Rather high filling levels (mass fraction of residues from the resin after carbonization is from about 45 to about 50%) are necessary to achieve sufficient through-plane conductivity. Such highly-impregnated substrates suffer from two major disadvantages: low porosity (less than 80%) which is detrimental to reactant transport, and poor flexibility. Therefore, further processing of the electrode substrate has to be carried out batch-wise resulting in high process costs and large inter-lot variations due to the difficult control of the batch-wise processing steps.

A new kind of electrode substrate has been described (EP-A 1 139471), the flexibility of which should be sufficient to allow reel to reel processing as a roll material. This electrode substrate comprises a sheet formed of carbon fibers and optionally, an admixture of expanded graphite. An organic binder which might comprise polyvinyl alcohol or a thermosetting resin like a phenolic resin or a water repellent polymer like a fluoro resin is adhered to the sheet which is subsequently heat-treated. During this optional final heat treatment, the impregnated substrates are heated to a temperature not exceeding 700° C., preferably 550° C. or lower. This temperature range is sufficient for sintering of fluoro resins like PTFE and thermosetting of phenolic or epoxy resins, but not for carbonization of a resin. According to this document, carbonization of the resin must be avoided because it would make the electrode substrate fragile. Thus, the electrode substrate obtained by this process is not an all-carbon product, and the presence of non-conductive constituents between the fibers results in a rather high through-plane resistance of 50 mOhm·cm$^2$ of the sheets made without admixture of expanded graphite.

Another process for the production of continuous electrode substrates based on paper making technology is described in EP-A 0 791 974. Fibers selected from the group of carbon, glass, polymer, metal, and ceramic fibers, are dispersed in water with at least one catalyst component and a polymeric substance (e.g. PTFE) to obtain a dilute slurry and thereafter forming a continuous structure by the controlled deposition of said slurry onto a moving mesh bed, dewatering of the solids and drying, firing or hot pressing of the fiber containing layer under a suitable time/pressure/temperature regime, e.g. firing at a temperature in excess of 350° C. The polymeric binder used in this invention is not carbonizable. Therefore the carbon content of this kind of electrode substrate will be substantially lower than the carbon content of the above described carbon paper electrode substrates where a carbonizable binder was used. Thus the advantage of continuous processability is gained only at the expense of a reduced conductivity since the material described in EP-A 0 791 974 contains a certain fraction of non-conductive polymeric binders.

An electrode substrate which is an all carbon product and rollable (50 cm roll diameter) was recently described (WO-A 01 56 103). The carbon fiber non-woven obtained by a paper making process using a suitable binder (e.g. polyvinyl alcohol), subsequent impregnation with a carbonizable resin optionally containing conductive fillers like carbon black, hot pressing and carbonization. But to ensure rollability, it is essential that at least 40% of the carbon fibers are very fine fibers (diameter of from 3 to 5 µm). Such fine carbon fibers are not a common high-volume industrial product, but a specialty. Thus an electrode substrate made of such fibers probably will not match price targets for fuel cell commercialization.

Consequently, to enhance fuel cell commercialization electrode substrates are required which combine optimal reactant permeability and sufficient through-plane conductivity with low material costs and improved industrial processability.

OBJECTS AND BRIEF SUMMARY OF THE INVENTION

To achieve the above targets, it is an object the invention to provide an electrode substrate that combines the preferable features of the commercially available state-of-the-art carbon fiber sheet electrode substrates, i.e. high carbon content (a mass fraction in excess of 98%) and therefore high electrical conductivity with the advantage of high porosity and continuous processability as rolled good.

It is another object of the invention to provide a method for the manufacturing of an electrode substrate according to the invention from a low cost precursor.

The present invention therefore provides a carbon fiber electrode substrate comprising a paper made from carbon fibers, wherein the carbon fibers employed have a diameter of from about 6 to about 10 µm, and a mean length of from about 3 to about 20 mm, preferably from about 4 to about 15 mm, and particularly preferred from about 6 to about 12 mm, wherein at least a part of the voids between the fibers constituting the paper are filled with carbonaceous particles, which carbonaceous particles comprise particles of graphite and of other forms of elemental carbon, wherein the thickness of the paper is from about 0.05 to about 0.4 mm, preferably from about 0.06 to about 0.38 mm, and particularly preferred from about 0.08 to about 0.33 mm, and wherein the bending radius to which the paper can be subjected without breaking is 250 mm or more. In the case where very thin paper is used to make the electrode substrate, even bending radii of as small as 200 mm can be used without damage to the paper structure. It is also preferred to use such carbon fibers where the limiting values of the length and diameter intervals stated supra correspond to the exact values stated.

The electrode substrate of the invention is obtained from a precursor which is made by state-of-the-art paper-making technology from commercially available carbon fibers with a diameter of from about 6 to about 10 µm. Such carbon fibers are a high-volume industrial product, therefore the precursor is of relatively low cost. Papers made of such carbon fibers are available as rolled good. Preferably, the precursor for the electrode substrate of the invention is characterized by a large porosity (a volume fraction of pores in the paper of at least 90%) and homogeneity. In the context of this invention, a paper is regarded as homogeneous if the determination of the thickness or the mass by area ratio for random samples of 1 by 1 $cm^2$ cut out of the paper has a deviation (mean square deviation) of not more than 15%, preferably not more than 10%, and especially preferred not more than 6%.

According to the invention, the carbon fiber paper precursor is converted into an electrode substrate material with sufficient structural integrity under fuel cell conditions and conductivity both in-plane and through-plane. To achieve this the precursor is subjected to a continuous process comprising the steps of impregnation with a slurry containing dispersed carbonaceous, or preferably graphitic, particles and a binder which can be carbonized or graphitized with a high carbon yield, drying, curing of the binder and carbonization or graphitization. The ratio of binder and dispersed carbonaceous, or preferably graphitic conductive material within the impregnation slurry and the load of impregnation agent applied to the carbon fiber paper have been optimized in such a way that sufficient mutual binding of the carbon fibers is provided whereas the impregnated carbon fiber paper remains rollable after curing and carbonization or graphitization of the binder. The preferred mass ratio of binder and carbonaceous particles within the slurry is between 40:60 and 70:30, while the weight of the precursor is increased upon impregnation by a factor of from about 2 to about 4. Upon carbonization or graphitization, the weight of the binder is decreased by one half, resulting in a mass fraction of binder in the final product of not more than about 10 to about 30%. It is assumed that this rather low binder content is essential to prevent that the paper becomes stiff and brittle after curing and carbonization or graphitization of the binder. Simultaneously, the capability of the incorporated graphite particles to act as a lubricant advantageously affects the flexibility of the electrode substrate material. Due to this advantageous features in contrast to the aforementioned prior art, all manufacturing and further processing steps of the electrode substrate can be carried out in a continuous reel-to-reel mode.

For application as electrode substrate in a fuel cell, several important parameters like the pore fraction and pore size distribution, thickness, compressibility, hydrophilicity and hydrophobicity need to be further adjusted. This can be achieved by applying further impregnation agents or/and coatings to the product obtained by the above described process. It is therefore another object of the invention to provide appropriate impregnation and coating agents and procedures.

The electrode substrate of the invention is obtained as rolled good (rollable to a reel diameter of from about 250 to about 300 mm) with a large porosity (in excess of 80%) as necessary for unhindered mass transfer without undue lowering of the conductivity. It is manufactured from common, commercially available precursors in a continuous process. The properties of the final product may be further optimized by application of secondary impregnation agents and/or coating layers if necessary. Generally, the electrode substrates of the invention are characterized by improved processability and optimized performance under fuel cell conditions.

The foregoing and other objects, features and advantages of the present invention will become more apparent from the following detailed description and examples.

DETAILED DESCRIPTION OF THE PREFERRED EMBODIMENTS

Figure 1:
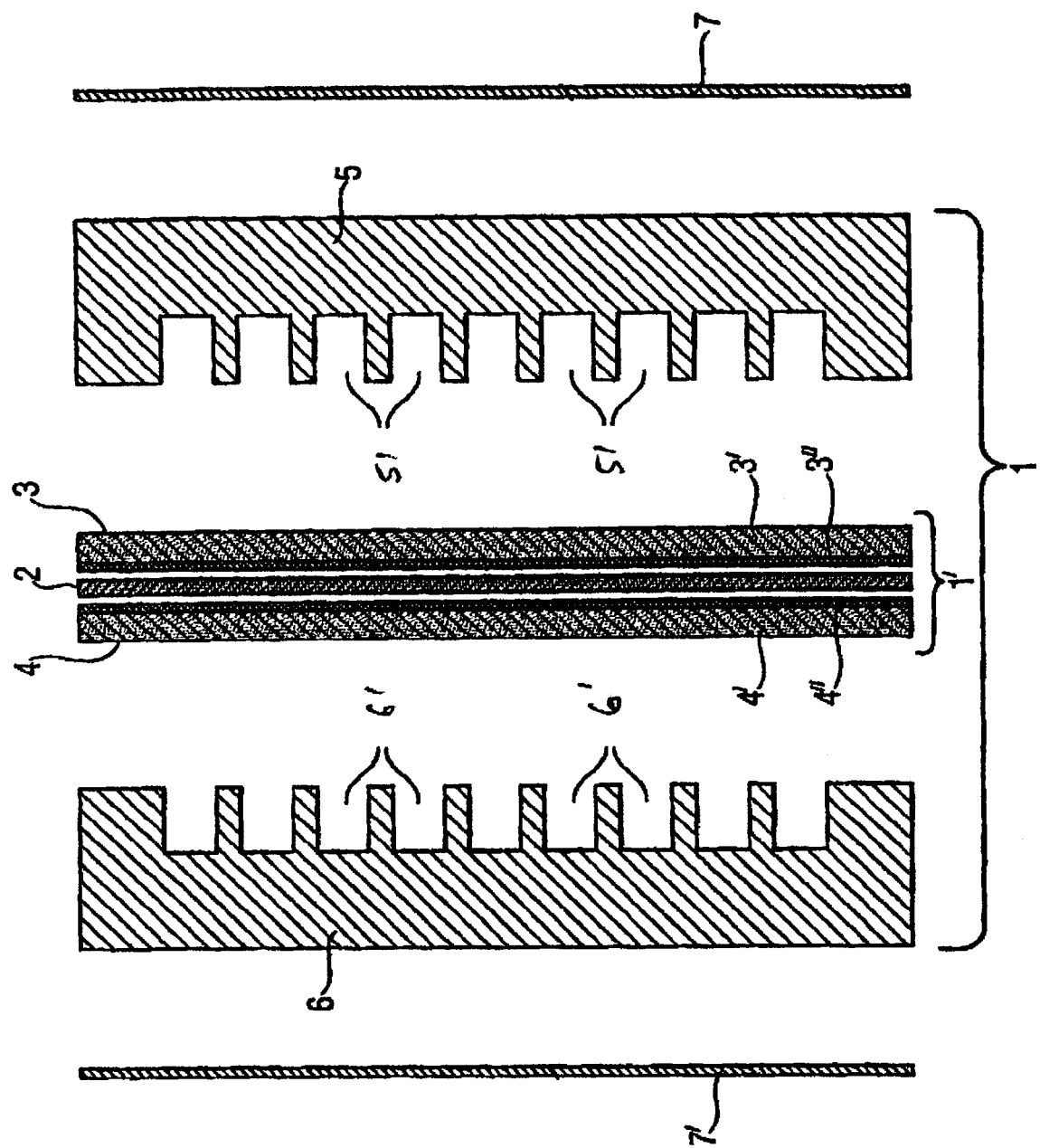
FIG. 1 is an exploded side view of a single cell showing the structure of a phosphoric acid, or a membrane, fuel cell, viz., a flat plate electrode fuel cell where the electrode substrate of the present invention can be applied.

It is preferred that the carbon fiber electrode substrate has a mass fraction of carbon in the form of carbon fibers and carbonaceous particles is at least about 94%.

It is further preferred that the carbon fiber electrode substrate has a porosity, stated as the ratio of the open volume to the sum of the open volume, the volume occupied by the carbon fibers, and the volume occupied by all solid materials comprising fillers, of at least 80%.

It is further preferred that in the carbon fiber electrode substrate, the carbonaceous particles comprise a mass fraction of from about 60 to about 70% of graphite particles.

It is further preferred that in the carbon fiber electrode substrate, the size of the carbonaceous particles is less than or equal to the diameter of the carbon fibers.

It is further preferred that in the carbon fiber electrode substrate, the mass fraction of carbonaceous particles in the substrate is from about 10 to about 50%.

It is further preferred that the carbon fiber substrate has a through-plane resistivity of not more than 8 mOhm·cm$^2$.

It is further preferred that the carbon fiber electrode substrate is further impregnated with an impregnant or a mixture of impregnants modifying the wetting of the carbon fiber paper as evidenced by the contact angle of a drop of water on the said substrate. The contact angle of the drop of water may be higher (hydrophobic coating) or lower (hydrophilic coating, compared to the contact angle of the unmodified electrode substrate.

In one preferred embodiment, the impregnant comprises a hydrophobic polymer, which is preferably a partly or totally fluorinated polymer. It is further preferred that the mass fraction of the impregnant in the impregnated carbon fiber electrode substrate is between 2 and 40%.

In another preferred embodiment, the impregnant comprises a hydrophilic agent which preferably is an ionomer.

It is further preferred that the carbon fiber electrode substrate is further coated with a coating layer comprising particles of partly or totally fluorinated polymers and conductive particles. The mass fraction of fluorinated polymers in the coating is preferably between 5 and 95%. As conductive particles, it is preferred to use carbon black.

In another preferred embodiment, the carbon fiber electrode substrate can further be coated with a coating comprising hydrophilic particles and conductive particles. Again, carbon black is preferred as conductive material.

It is further preferred that at least one surface of the carbon fiber electrode substrate is plasma treated in the presence of oxygen.

To obtain the electrode substrate of the present invention, a carbon-fiber paper is employed as the precursor. Such a paper made from PAN-based fibers with a diameter of, e.g., 7 μm is commercially available under the trademark ® SIGRAFIL C.

Alternatively carbon fiber papers made from carbonized pitch fibers, rayon fibers, pulp fibers or others of 6 . . . 10 μm diameter can be utilized. In order to take advantage of all the merits of the invention it is preferable that the paper is available as rolled good. Preferably the carbon fiber paper has a large porosity and a high conductivity. The higher the conductivity of the precursor the less further carbon material has to be incorporated during the impregnation process and the more of the flexibility and permeability of the precursor remains after the impregnation. On the other hand the higher the porosity of the precursor the more conductive filling material can be impregnated without unacceptable reduction of the reactant permeability. A suitable precursor made of the above-mentioned PAN-based carbon fibers is characterized by a porosity of approximately 93 to 96% and a through-plane resistivity of 1 to 3 Ohm·cm.

For the manufacturing of the carbon fiber based electrode substrate, it is preferred to conduct the following steps:

a— preparing a carbon fiber paper with a thickness of from 0.05 to 0.5 mm from carbon fibers having a diameter of from about 6 to about 10 μm, and a mean length of from about 3 to about 20 mm, preferably from about 4 to about 15 mm, and particularly preferred from about 6 to about 12 mm, b— impregnating the carbon fiber paper of step a with a slurry of carbonaceous particles in a solution or dispersion of binder polymers that form a carbonaceous residue upon heating in an atmosphere devoid of oxygen at a temperature of at least 800° C., c— drying the impregnated paper at a temperature between about 50 to about 130° C. to remove solvents and/or dispersants, and heating the dried paper to a temperature between 150 and 300° C. to cure the binder polymers, and d— heating the impregnated paper of step c at a temperature of from about 800 to about 1500° C. in an atmosphere substantially devoid of oxygen for a time long enough to convert the cured binder to carbonaceous particles. It is preferred to conduct steps b through d in a continuous mode.

Another preferred process for the production of carbon fiber electrode substrates comprises the steps of a— preparing a carbon fiber paper with a thickness of from 0.05 to 0.5 mm from carbon fibers having a diameter of from about 6 to about 10 μm, and a mean length of from about 3 to about 20 mm, preferably from about 4 to about 15 mm, and particularly preferred from about 6 to about 12 mm, b— impregnating the carbon fiber paper of step a with a slurry of carbonaceous particles in a solution or dispersion of binder polymers that form a carbonaceous residue upon heating in an atmosphere devoid of oxygen at a temperature of at least 800° C., c— drying the impregnated paper at a temperature between about 50 to about 130° C. to remove solvents and/or dispersants, and heating the dried paper to a temperature between 150 and 300° C. to cure the binder polymers, and d— heating the paper of step d at a temperature of from about 1500° C. to about 2500° C. in an atmosphere substantially devoid of oxygen for a time long enough to convert the cured binder to graphite. This process can also be preferably conducted in a way that steps b through d are executed in a continuous mode.

If steps b through d are conducted in a continuous mode, it is preferred to supply the carbon fiber paper in step b from a roll, and the carbon fiber paper of the last step is taken up on a roll.

It is further preferred to subject the carbonised or graphitised carbon fiber paper to a further impregnation step with an impregnant or a mixture of impregnants modifying the wetting of the carbon fiber paper as evidenced by the contact angle of a drop of water on the said substrate. In this embodiment, it is also preferred to supply the carbon fiber paper from a roll, and to take up the impregnated carbon fiber paper on a roll.

In one preferred embodiment, the impregnant comprises a hydrophobic polymer, preferably a partly or totally fluorinated polymer. Here, the impregnant is preferably applied in such an amount that the mass fraction of the impregnant in the impregnated carbon fiber paper is between 2 and 40%.

In another preferred embodiment, the impregnant comprises a hydrophilic agent, particularly an ionomer.

It is further preferred to apply a further coating to the carbon fiber paper, comprising particles of partly or totally fluorinated polymers and conductive particles. This coating step can also preferably be conducted in a way where the carbon fiber paper is supplied from a roll, and the coated carbon fiber paper is taken up on a roll. It is further preferred to apply this coating so that the mass fraction of fluorinated polymers in the coating is between 5 and 95%, especially preferred from 5 to 40%.

The conductive particles preferably comprise carbon black.

It is further preferred to apply another coating on the carbon fiber paper, comprising hydrophilic particles and conductive particles.

Another preferred embodiment is to subject at least one surface of the carbon fiber paper to a plasma treatment in the presence of oxygen.

These preferred features are explained below in more detail.

It is further desired that thickness and area weight of the paper are quite homogeneous (root mean square deviation of not exceeding 15%, preferably not exceeding 10%, and particularly preferred not exceeding 6% obtained from 100 thickness or mass by area ratio measurements statistically distributed throughout the paper web). The binder used in the paper-making process needs to be a material that will set at a relatively low temperature thereby bonding the carbon fibers and fixing the structure during the further treatment (i.e. the impregnation process) and that will be removed from the substrate by volatilization or decomposition during heat treating. Typically, polyvinyl alcohol (PVA) is used as a binder.

The above-described carbon fiber paper precursor is now converted into an electrode substrate material with sufficient structural integrity under fuel cell conditions and conductivity both in-plane and through-plane. Therefore, the precursor paper is impregnated with a slurry containing a carbonizable or graphitizable binder and dispersed graphitic particles, dried and cured and subsequently heat-treated under inert conditions to carbonize or graphitize the binder.

Suitable binders comprise, but are not limited to, phenolic resins, epoxy resins and furane resins. As the particulate carbonaceous material, synthetic graphite powder, graphite nanofibers, expanded graphite or mixtures of graphitic carbon particles and non-graphitic carbonaceous particles (e.g. carbon black) may be employed, whereby this list not limiting. It was found that the lubricating effect of incorporated particles with the graphite layer structure is a prerequisite to keep the material flexible after the carbonization or graphitization of the binder. Therefore it is essential that the major fraction (a mass fraction of at least 90%) of the carbonaceous particulate material has a graphite-like structure. To ensure complete integration of the graphite particles into the carbon fiber network it is necessary that the particle size of the carbonaceous or graphite filler does not exceed the fiber diameter.

Preferably a water-based slurry is used, but the use of other liquids compatible with the substrate, the binder and the carbonaceous material used is not excluded.

The ratio of binder and dispersed carbonaceous or graphitic conductive material and the load of impregnation agent applied to the carbon fiber paper have been optimized in such a way that sufficient mutual binding of the carbon fibers is provided whereas the impregnated carbon fiber paper remains rollable after curing and carbonization or graphitization of the resin. The preferred mass ratio of carbonizable or graphitizable binder and carbonaceous particles within the slurry is between 40:60 and 70:30, most preferred between 45:55 and 55:45. The total mass fraction of dissolved and dispersed solid material (binder and graphitic particles) in the slurry is in the range of 5 to 40%.

The impregnation can be repeated several times, depending on the desired content of impregnants in the final product. Preferably, the content of additional carbon originating from the impregnants in the final product amounts to mass fractions of from 25 to 75%, most preferred between 40 and 60%. This is achieved with a sequence of at least one, and usually up to three impregnation steps.

The impregnation agent or the impregnation mixture can be applied by various techniques. Such techniques include, but are not limited to, transfer coating, roller coating, dipping, doctor-blade techniques, and spraying.

The impregnated carbon fiber paper is dried at 50 to 130° C., and optionally further heat-treated at 150 to 300° C. to cure the binder in continuous reel-to-reel processes.

After drying (and optionally further heating) the impregnated carbon fiber paper is subjected to carbonization or graphitization.

The carbonization or graphitization is carried out as a reel-to-reel process in a continuous-processing furnace. Under inert gas atmosphere, the impregnated carbon fiber paper is treated at temperatures between approximately 800° C. and approximately 1500° C. for carbonization, or between approximately 1500 and approximately 2500° C., most preferably between 1650 and 2000° C., for an appropriate time in each case. During this treatment the carbonizable or graphitizable binder surrounding the graphite particles of the filler is converted to carbon, and a nearly all carbon product is obtained. Upon carbonization or graphitization the resin is subjected to a mass loss. The mass ratio between the components (resin and graphite particles) incorporated into the paper changes from between 45:55 and 55:45 in the impregnated slurry into between 30:70 and 40:60 in the final product.

In the final product, which contains a mass fraction of impregnant of preferably from 40 to 60%, with a mass fraction of from about 30 to about 40% of carbonized and/or graphitized resin, the mass fraction of carbonized or graphitized resin is between about 10 and about 30%. This value is remarkably lower than the mass fraction of carbonized resin of from 45 to 50% of the paper-based electrode substrate described in U.S. Pat. No. 4,851,304. It is believed that the low resin content and the above mentioned lubricating effect of the incorporated graphite particles are responsible for the high flexibility and low brittleness of the paper, allowing winding of the electrode substrate and take-up on reels with a diameter of 250 to 300 mm.

For application as electrode substrate in a fuel cell, several important parameters of the product obtained from the above-described process, e.g. pore fraction and pore size distribution, compressibility, thickness, hydrophilicity and hydrophobicity might need to be further adjusted. This may be achieved by applying appropriate impregnation agents to the carbonized or graphitized electrode substrate. In the following this process will be referred to as "secondary impregnation". These secondary impregnation agents include liquid solutions or dispersions of impregnation agents or mixtures of an impregnation agent with chemically inert and electrically conductive particles. Like the preceding processes, the secondary impregnation is preferably carried out as a continuous reel-to-reel process. The impregnation agent or the impregnation mixture can be applied by various techniques. Such techniques include, but are not limited to, transfer coating, roller coating, dipping, doctor-blade techniques, and spraying. The impregnant content of the electrode substrate is determined by the number of impregnation steps or by the concentration of the impregnation solution.

Optionally, chemically inert and conductive particles can be added to the secondary impregnation agent(s) for adjusting the viscosity of the impregnation mixture and for adjusting certain properties of the final ES such as the pore structure, contact resistance, and mechanical strength. Due to the high conductivity of the electrode substrate obtained by the above-described processes, use of low- or non-conductive secondary impregnation agents or additives is not precluded, if such additives are particularly suitable for achieving the desired properties of the electrode material. Such additives may be useful to optimize the surface hydrophobicity or hydrophilicity according to the requirements of the desired fuel cell application.

To introduce hydrophobicity, the substrate may be impregnated with a liquid solution or dispersion of partially or completely fluorinated resins such as PTFE, PVDF, ethylene tetrafluoroethylene copolymers, optionally with carbon particles of low specific surface or carbon particles functionalized with hydrophobic surface groups as additives, this list not being limiting. Preferably, the electrode substrate is hydrophobized by impregnating with PTFE resulting in a mass fraction of PTFE of about 2 to about 40%.

On the other hand, if increased hydrophilicity is desired, hydrophilic substances like silica, zeolite, metal oxides, hydroxides and oxyhydroxides, ionomers, carbon particles with high specific surface like carbon black or carbon particles functionalized with hydrophilic surface groups may be added to the impregnation mixture. Alternatively, hydrophilic surfaces can be generated by a plasma treatment resulting in the oxidation of surface groups of the graphitized substrate.

In accordance with the present invention, the amount of impregnation agent, additional particles, and impregnation mixture applied to the substrate depends on the nature of the used agents and particles, on the impregnated substrate structure as well as on the desired properties of the final ES. Generally, the ratio of the mass of the impregnation agent or impregnation mixture to the mass of the substrate structure may be from 5:100 to 400:100, preferably from 10:100 to 300:100, and most preferred from 25:100 to 250:100.

Figure 2:
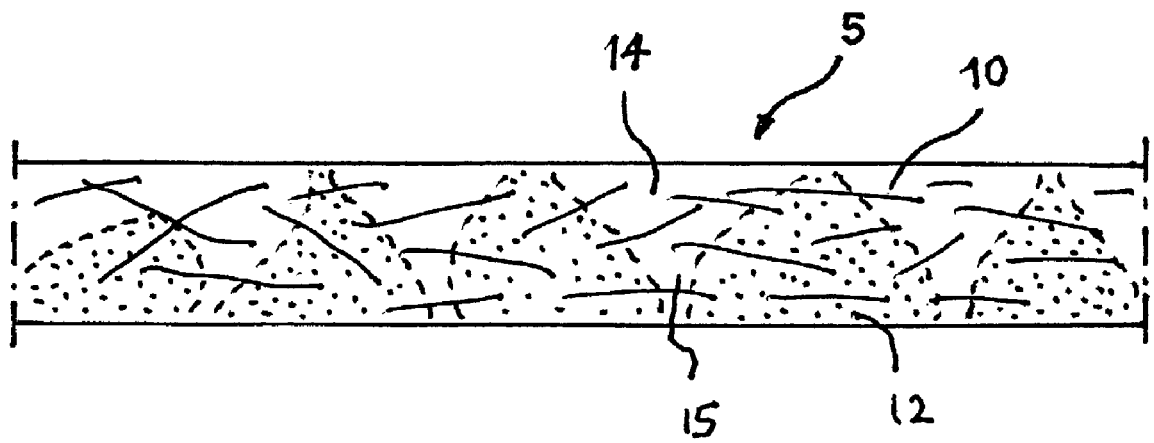
FIG. 2 is a side view (cross-section) of an ES with a pore size gradient according to this invention.

In one embodiment of the secondary impregnation process, the secondary impregnation agent or impregnation mixture is applied single-sided only resulting in a porous structure with a gradient. Such a structure is shown as a cross-section in FIG. 2. Single-sided impregnation means that the impregnating agent is applied to the substrate on one side only (the bottom side in the structure as depicted in FIG. 2), usually resulting in a non-homogeneous saturation of the substrate with the impregnating agent, with the region opposite to the side where the impregnating agent had been administered having a lower content of impregnating agent, and therefore, a higher fraction of open or unfilled pores. Such a gradient pore structure facilitates a better reactant distribution to the catalyst layer. It has been found that the pores of such single-side impregnated structures have a cone-like shape. This is illustrated in FIG. 2, where a substrate of carbon fibers 10 has been impregnated, the impregnating agent having been administered from the bottom side of the substrate only. The impregnating agent 12 is concentrated in the lower part of the cross-section, leading to formation of small pores 15 in the bottom region of the ES, while larger pores 14 are formed in the upper regions of the ES, where less impregnation agent has penetrated.

Figure 3:
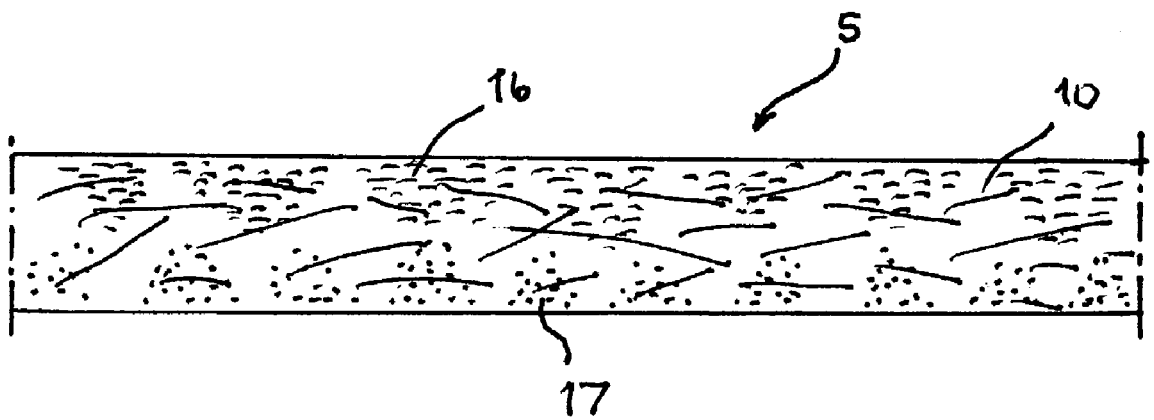
FIG. 3 is a side view (cross-section) of an ES with a property gradient perpendicular to the planar direction according to this invention.

Another embodiment of the secondary impregnation process comprises a simultaneous or subsequent double-sided impregnation process. Impregnation agents or impregnation mixtures which preferably are not identical are applied to the opposite (top and bottom) faces of the substrate. This procedure can be required for imparting different properties into the top and bottom faces of the ES such as, but not limited to, surface roughness, pore size, microporosity, water contact angle, and capillarity. The result of such impregnation method is shown in FIG. 3, where the substrate of carbon fibers 10 has regions where one impregnation agent (administered from the top surface) has penetrated and formed a porous zone 16, whereas another impregnation agent which had been administered from the bottom face has penetrated the lower region and formed another porous zone 17. As in FIG. 2, the individual pores formed have a conical structure, the narrow region being adjacent to the side from where the impregnation agent has been applied.

In such an ES which top and bottom surfaces were treated with different impregnation agents, a property gradient perpendicular to the planar direction can be detected which results from using different impregnation agents or impregnation mixtures for the top and bottom side of the ES. This fact is illustrated in FIG. 3 (see above). The gradient is governed by the diffusion velocity of the impregnating agents within the porous structure of the substrate. If the impregnating agents also comprise particulate fillers, a filtration effect may be added if the pore size is not considerably larger than (more than twice the size of) the filler particles.

In another embodiment of the invention, a conductive surface-modifying coating is applied to one surface of the electrode substrate. The electrode substrate may be subjected to a secondary impregnation process before. To avoid penetration of the coating particles into the pores, the coating mixtures applied preferably have a paste-like consistency, water based pastes being most preferred. The paste can be applied by various techniques. Such techniques include, but are not limited to, transfer coating, roller coating, screen-printing, doctor-blade techniques, and spraying.

Preferably, a coating containing one of the aforementioned hydrophobizing or hydrophilizing agents and particulate carbon (e.g. a particulate carbon of high specific surface area like carbon black) is applied to the electrode side facing the catalyst layer when assembled in the fuel cell. The coating smoothens the electrode substrate surface thereby avoiding puncture of the membrane by protruding fibers. Additionally the coating avoids penetration of the catalyst into the pores of the electrode substrate where the catalyst becomes ineffective because electrolyte contact is lost. Referring to this function, the coating layer can be considered as a catalyst supporting layer. Due to the large specific surface of the carbon black in the catalyst supporting layer the three-phase interface between catalyst, electrolyte and reactant-transporting pores is enlarged. The carbon black in the coating improves electronic contact between catalyst and electrode substrate, while the hydrophobic component prevents the electrolyte membrane from loosing too much humidity.

Preferably the coating consists of PTFE and particulate carbon of high specific surface area (preferably from about 75 to about 1500 $m^2/g$) with a mass fraction of PTFE of between 5 and 95%, most preferably between 5 and 40%. The coating load is between 10 and 60 $g/m^2$, and the thickness of the coating layer is between 20 and 60 μm whereby more than one coating layer with a thickness within this range can be applied.

Electrode substrates manufactured according to the processes of this invention are based on an all-carbon-product which can be formed into rolled good. Thus reel-to-reel processing throughout the whole manufacturing process without compromising mechanical properties is possible, resulting in low production costs, high homogeneity of the final product and low scrap rates. With the electrode substrate available as rolled good, further fuel cell manufacturing process steps like catalyst coating of electrode substrates and lamination with a polymer electrolyte membrane or lamination of electrode substrates with a catalyst-coated membrane can be carried out in reel-to-reel mode too. The possibility of continuous industrial manufacturing and further processing of the electrode substrate will contribute to the cost reduction necessary for fuel cell commercialization.

The electrode substrates made available by the present invention can advantageously be applied in a variety of electrochemical applications. One application is as a gas diffusion electrode for an electrochemical cell, comprising such an electrode substrate with a catalyst layer adjacent to on one of the major surfaces of said electrode substrate. A further application is as a membrane electrode assembly for an electrochemical cell, particularly preferred a fuel cell, comprising a proton conducting membrane sandwiched between two such electrode substrates wherein catalyst layers are deposited between the surfaces of the membrane and the adjacent electrode substrates.

Electrochemical cells are preferably constructed by
sandwiching an electrolyte layer between two such electrode substrates with catalyst layers deposited between the electrolyte layer and the adjacent electrode substrates to obtain an electrode-electrolyte assembly;

assembling said electrode-electrolyte assembly between an anode plate and a cathode plate; or alternatively assembling said electrode-electrolyte assembly between the anode side of a first bipolar plate and the cathode side of a second bipolar plate to obtain the repeating unit of a cell stack, and stacking a plurality of said repeating units to obtain a stack of electrochemical cells;

providing means to supply and remove fuel and oxidant to and from the stacked cells and providing electric contacts for withdrawal of electric current at both ends of the stack.

The advantages of the electrode substrate according to the invention will now be further illustrated by examples.

EXAMPLES

Example 1

A carbon fiber paper characterized by a porosity of approximately 95%, a through-plane resistance of 60 mOhm·$cm^2$ and a thickness of 0.17 mm was used as the precursor. The carbon fiber paper was made of PAN-based carbon fibers with a diameter of 7 μm available under the trademark ® SIGRAFIL C. The paper was utilized as rolled good.

The paper web was two times impregnated with a water-based slurry containing mass fractions of 10% of dispersed phenolic resin and 10% of graphite powder, with 90% of the particles being smaller than 5.5 μm. The impregnated paper was dried and the resin was cured. For drying and curing the paper webs were conveyed at a rate of 100 m/h through a continuous furnace. The temperature the material was subjected to increased from 100° C. at the entrance zone of the furnace to 250° C. near the exit. Subsequently the resin impregnated paper was graphitized under a nitrogen atmosphere at a temperature of 1700° C. in a continuous processing furnace. The paper web was conveyed through the graphitizing furnace at a rate of 40 m/h. All processing steps were carried out in a reel-to-reel mode.

Example 2

A carbon fiber paper made of PAN based carbon fibers (® SIGRAFIL C, 7 μm diameter), characterized by a porosity of approximately 94%, through-plane resistance of 60 mOhm·$cm^2$ and a thickness of 0.28 mm was used as the precursor. Further processing was the same as in Example 1

Example 3

The precursor of Example 2 was impregnated once only and further processed as described in Example 1.

Example 4

An electrode substrate prepared as described in Example 2 was subjected to a secondary impregnation process with an aqueous slurry containing a mass fraction of 2% of PTFE, resulting in a mass fraction of PTFE content of 3% in the electrode substrate. The secondary impregnation was carried out in a reel to reel mode.

Example 5

An electrode substrate as prepared in Example 4 was coated with 35 g/m² of an aqueous paste comprising mass fractions of 13% of carbon black and 4% of PTFE. In a fuel cell test, the coated side of the electrode substrate was exposed to the catalyst coated membrane. For this example, the porosity cannot be given because it consists of two layers with different pore structures.

The characteristics of the final products are compiled in table 1.

Comparative Example 1

For comparison, characteristic data of a graphitized nonwoven-based electrode (PCT patent application WO-A 01/04980) substrate invented by some of the inventors of the present invention are given in table 1, too.

The precursor of this process is a hydroentangled PAN fiber nonwoven with a thickness of 0.34 mm. The nonwoven web was subjected to a continuous oxidative stabilization treatment as described in EP 0 743 381 and subsequently carbonized at 1000° C. The carbonized nonwoven is impregnated with the above-described slurry, dried and the resin is cured and graphitized in the same way as described above. All process steps were carried out in a reel to reel mode.

The weight changes related to the different process steps in the Examples 1 through 3 and the Comparative Example 1 are listed in table 2.

Comparative Example 2

An electrode substrate of Comparative Example 1 was subjected to a secondary impregnation process with an aqueous slurry containing a mass fraction of 2% of PTFE, resulting in a mass fraction of PTFE of 3% in the electrode substrate and coated with 35 g/m² of an aqueous paste comprising mass fractions of 13% of carbon black and 4% of PTFE.

Comparative Example 3

For further comparison, characteristics of a commercially available electrode substrate (TGPH 60 from Toray Industries Inc.) were measured and included as Comparative Example 3 in table 1. It has to be noted that this electrode substrate is available as sheets only.

From the above data it is obvious that the material of the invention is superior in porosity and through-plane conductivity. Although the fibers in the precursor papers are mainly aligned in plane, the through plane resistance is sufficiently low. This avoids the necessity of introducing an at least partly non-planar alignment of fibers (as in WO-A 01/04980) which could result in membrane puncturing by protruding fibers.

Taking into account all the characteristic data given in table 1 the electrode substrates of the invention are comparable with the state of the art. Any less favorable value of the electrode substrates of the invention is greatly compensated by the advantage of processability as a rolled good.

Figure 4:
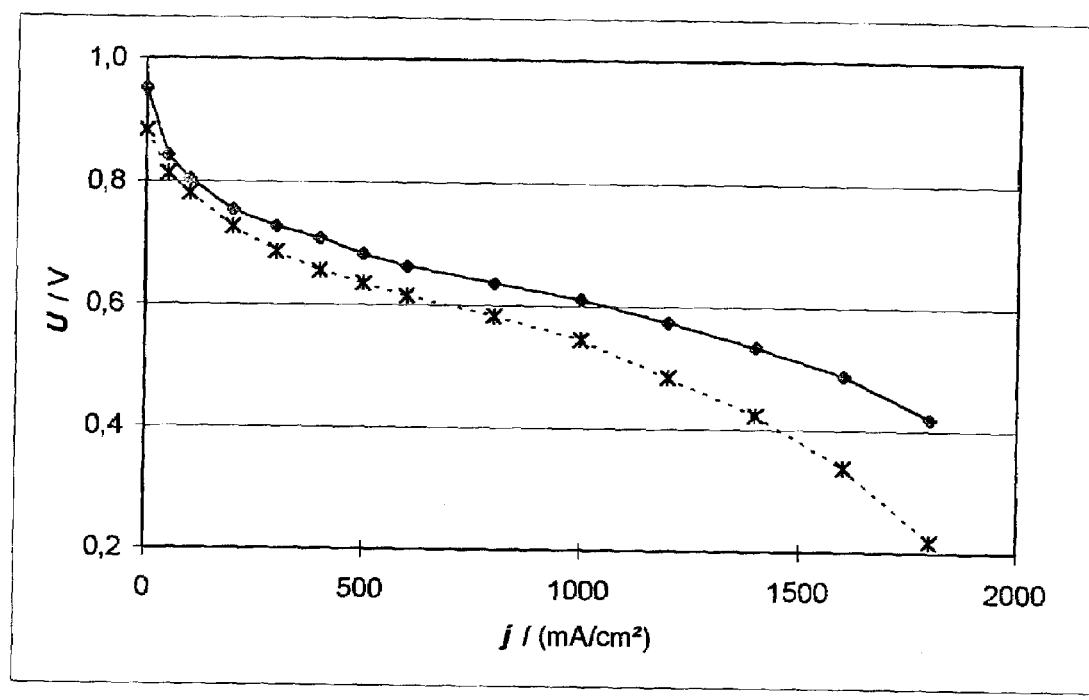
FIG. 4 shows the voltage versus the current density measured in a fuel cell with electrode substrates of the invention and a comparative material For the sake of clarity only a few of the carbon fibers constituting the paper have been shown in FIGS. 2 and 3.

The electrode substrates of Example 5 and Comparative Example 2 were also tested in fuel cell operation at 75° C. under ambient pressure with hydrogen (humidified at 70° C.) as the fuel and air (humidified at 60° C.) as the oxidant. Two electrode substrates were combined with a catalyst coated membrane ® PRIMEA5510 purchased from W. L. Gore & Associates. Hydrogen utilization was set to 70% and air utilization was 50%. Test results are depicted in FIG. 4. Due to the low ohmic resistance the slope of the curve of Example 5 (♦) in the medium current range is very shallow, compared to the results with Comparative Example 2 (*). Only at high current density there is a slight bending of the curve of Example 5 toward a diffusion limited current, thus for a very broad range of current densities the electrode substrate offers optimal conditions for the transport of reactants.

While particular materials, processes and embodiments of this invention have been described, this description is not meant to be construed in a limiting sense. It is understood that various modifications of the preferred embodiments, as well as additional embodiments of the invention, will be apparent to those skilled in the art upon reference of this description without departing from the spirit and scope of the invention, as defined in the following claims. It is therefore contemplated by the appended claims to cover any such modifications or embodiments that fall within the true spirit and scope of the invention.

TABLE 1

Characterization of Examples and Comparative Examples

| Property | Unit | Example 1 | Example 2 | Example 3 | Example 4 | Example 5 | Comparative Example 1 | Comparative Example 3 |
|---|---|---|---|---|---|---|---|---|
| Available as | | Rolled good | | | | | | Sheets only |
| Thickness | μm | 210 | 280 | 320 | 280 | 300 | 380 | 200 |
| Areal weight | g/m² | 55 | 95 | 60 | 100 | 135 | 80 | 80 |
| Porosity | % | 86 | 81 | 88 | 81 | n.d. | 88 | 77 |
| Air permeability | cm³/(cm² · s) | 60 | 90 | 130 | 40 | 2.5 | 140 | 35 |
| Electric through plane resistance | mOhm · cm² | 5 | 4.8 | 4.8 | 10.5 | 11.5 | 5.5 | 4.0 |
| Plastic/elastic compressibility | μm/μm | 55/20 | 45/20 | 60/20 | 30/15 | 30/15 | 130/40 | 10/20 |
| Homogeneity of thickness | % | 6 | 6 | 6 | 6 | | 8 | 4 | n.d.: not determined

TABLE 2

Areal weight as function of process steps

|  | Example 1 Areal weight (g/m$^2$) | Example 2 Areal weight (g/m$^2$) | Example 3 Areal weight (g/m$^2$) | Comparative Example 1 Areal weight (g/m$^2$) |
|---|---|---|---|---|
| Precursor | 17 | 34 | 34 | 43 |
| Impregnated | 60 | 110 | 70 | 105 |
| Graphitized | 55 | 95 | 60 | 82 |

The invention claimed is:

1. A carbon fiber electrode substrate comprising a paper made from carbon fibers, wherein the entirety of the carbon fiber employed have a diameter of from about 6 to about 10 μm, said carbon fibers further having a mean length of from about 3 to about 20 mm, wherein at least a part of the voids between the fibers constituting the paper are filled with (i) carbonaceous particles (ii) carbonized or graphitized residue from a carbonizable or carbonizable binder, wherein the thickness of the paper is from 0.05 to 0.4 mm,
the bending radius to which the paper can be subjected without breaking is 250 mm,
and 90% of the mass of the carbonaceous particles is graphitic.

2. The carbon fiber electrode substrate of claim 1 wherein the mass fraction of carbon in the form of carbon fibers, carbonaceous particles and carbonized or garphitized residue is at least about 94%.

3. The carbon fiber electrode substrate of claim 1 wherein the porosity, stated as the ratio of the open volume to the sum of the open volume, the volume occupied by the carbon fibers, and the volume occupied by all solid materials comprising carbonaceous particles and carbonized or graphitized residue, is at least 80%.

4. The carbon fiber electrode substrate of claim 1 wherein the size of the carbonaceous particles is less than or equal to the diameter of the carbon fibers.

5. The carbon fiber substrate of claim 1 where the through plane resistivity of the substrate is below 8 mOhm·cm$^2$.

6. The carbon fiber electrode substrate of claim 1 whIch is further impregnated with an impregnant or a mixture of impregnants modifying the wetting of the carbon fiber paper as evidenced by the contact angle of a drop of water on said substrate.

7. The carbon fiber electrode substrate of claim 6 wherein the impregnant comprises a hydrophobic polymer.

8. The carbon fiber electrode substrate of claim 7 wherein the impregnant comprises a partly or totally fluorinated polymer.

9. The carbon fiber electrode substrate of claim 7 wherein the mess fraction of the impregnant in the impregnated carbon fiber electrode substrate is between 2 and 40%.

10. The carbon fiber electrode substrate of claim 6 wherein the impregnant comprises a hydrophilic agent.

11. The carbon fiber electrode substrate of claim 10 wherein the impregnant comprises an ionomer.

12. The carbon fiber electrode substrate of claim 1 which is farther coated with a coating layer comprising particles of partly or totally fluorinated polymers and conductive particles.

13. The carbon fiber electrode substrate of claim 6 which is further coated with a coating layer comprising particles of partly or totally fluorinated polymers and conductive particles.

14. The carbon fiber electrode substrate of claim 12 wherein the mass fraction of fluorinated polymers in to coating is between 5 and 95%.

15. The carbon fiber electrode substrate of claim 12 wherein the conductive particles comprise, carbon black.

16. The carbon fiber electrode substrate of claim 1 which is farther coated with a coating comprising hydrophilic particles and conductive particles.

17. The carbon fiber electrode substrate of claim 16 wherein the conductive particles comprise carbon black.

18. The carbon fiber electrode substrate of claim 1, wherein least one surface of the substrate is plasma treated in the presence of oxygen.

19. A carbon fiber electrode substrate according to claim 1, wherein the bending radius to which the paper can be subjected without breaking is 125 mm.

20. A carbon fiber electrode substrate comprising a paper made from carbon fibers, wherein
(i) the carbon fibers employed have a diameter of from about 6 to about 10 μm, and a mean length of from about 3 to about 20 mm,
(ii) at least a part of the voids between the fiber constituting the paper are filled with graphitic particles and a carbonized or graphitized residue from a carbonizable or graphitizable binder,
(iii) the mass ratio between the carbonized or graphitized residue and graphitic particles Is between 30:70 and 40:60,
(iv) the mass fraction of graphitic particles and carbonized or graphitized residue amounts to between 25 and 75% of the electrode,
(v) the thickness of the paper is from 0.05 to 0.4 mm, and
(vi) the paper can be subjected to a bending radius of 250 mm without breaking.

* * * * *

UNITED STATES PATENT AND TRADEMARK OFFICE
CERTIFICATE OF CORRECTION

| | | |
|---|---|---|
| PATENT NO. | : 7,144,476 B2 | Page 1 of 1 |
| APPLICATION NO. | : 10/496699 | |
| DATED | : December 5, 2006 | |
| INVENTOR(S) | : Wilde et al. | |

It is certified that error appears in the above-identified patent and that said Letters Patent is hereby corrected as shown below:

Column 16
Claim 9, Line 2, delete "mess" insert --mass--
Claim 14, Line 17, delete "to" insert --the--
Claim 16, Line 22, delete "farther" insert --further--
Claim 20, Line 42, delete "Is" insert --is--

Signed and Sealed this

Thirteenth Day of February, 2007

JON W. DUDAS
*Director of the United States Patent and Trademark Office*